(12) United States Patent
Lee et al.

(10) Patent No.: US 11,308,133 B2
(45) Date of Patent: Apr. 19, 2022

(54) ENTITY MATCHING USING VISUAL INFORMATION

(71) Applicant: International Business Machines Corporation, Armonk, NY (US)

(72) Inventors: Sunhwan Lee, San Mateo, CA (US); Pawan Chowdhary, San Jose, CA (US); Guangjie Ren, Belmont, CA (US)

(73) Assignee: International Business Machines Corporation, Armonk, NY (US)

( * ) Notice: Subject to any disclaimer, the term of this patent is extended or adjusted under 35 U.S.C. 154(b) by 508 days.

(21) Appl. No.: 16/147,126

(22) Filed: Sep. 28, 2018

(65) Prior Publication Data

US 2020/0104410 A1  Apr. 2, 2020

(51) Int. Cl.

| G06N 3/08 | (2006.01) |
|---|---|
| G06F 16/26 | (2019.01) |
| G06F 16/31 | (2019.01) |
| G06F 16/28 | (2019.01) |

(52) U.S. Cl.
CPC ............ *G06F 16/288* (2019.01); *G06F 16/26* (2019.01); *G06F 16/285* (2019.01); *G06F 16/313* (2019.01); *G06N 3/08* (2013.01)

(58) Field of Classification Search
None
See application file for complete search history.

(56) References Cited

U.S. PATENT DOCUMENTS

| 5,870,502 A * | 2/1999 | Bonneau ............ G06K 9/00268 |
| | | 382/249 |
| 8,903,848 B1 | 12/2014 | Bahrami et al. |
| 9,081,817 B2 | 7/2015 | Arasu et al. |
| 9,367,763 B1 * | 6/2016 | Gordo Soldevila ... G06K 9/325 |
| 10,445,431 B1 * | 10/2019 | Lev-Tov ................. G06F 40/40 |
| 10,467,526 B1 * | 11/2019 | Appalaraju .......... G06K 9/4619 |
| 10,607,118 B2 * | 3/2020 | Sacheti ................ G06F 16/532 |
| 10,776,626 B1 * | 9/2020 | Lin ....................... G06K 9/6253 |
| 2005/0105798 A1 * | 5/2005 | Nguyen .............. H04N 1/32149 |
| | | 382/181 |
| 2007/0286500 A1 * | 12/2007 | Akiyoshi ............. G06K 9/6211 |
| | | 382/232 |
| 2011/0106807 A1 | 5/2011 | Srihari et al. |
| 2016/0093048 A1 * | 3/2016 | Cheng .................. G06K 9/6289 |
| | | 382/131 |
| 2016/0171075 A1 | 6/2016 | Erenich et al. |
| 2017/0124181 A1 | 5/2017 | Nauze et al. |

(Continued)

FOREIGN PATENT DOCUMENTS

WO  2016205286 A1  12/2016

*Primary Examiner* — Mark D Featherstone
*Assistant Examiner* — Navneet Gmahl
(74) *Attorney, Agent, or Firm* — Sherman IP LLP; Kenneth L. Sherman; Hemavathy Perumal

(57) ABSTRACT

One embodiment provides a method comprising receiving a first set of information corresponding to a first entity and receiving a second set of information corresponding to a second entity. Each set of information received corresponding to each entity comprises visual information relating to the entity. The method further comprises encoding each set of information, and classifying the first entity and the second entity as either matching entities or non-matching entities based on the encoding.

18 Claims, 6 Drawing Sheets

(56) References Cited

U.S. PATENT DOCUMENTS

| | | | |
|---|---|---|---|
| 2017/0223003 A1 | 8/2017 | Miles et al. | |
| 2017/0286805 A1 | 10/2017 | Yu et al. | |
| 2017/0293480 A1* | 10/2017 | Wexler | H04L 67/34 |
| 2018/0089543 A1* | 3/2018 | Merler | G06K 9/4628 |
| 2018/0137150 A1* | 5/2018 | Osesina | G06N 5/048 |
| 2018/0143966 A1* | 5/2018 | Lu | G06F 40/30 |
| 2018/0165546 A1* | 6/2018 | Skans | G06N 3/0454 |
| 2018/0232451 A1* | 8/2018 | Lev-Tov | G06N 3/08 |
| 2018/0341863 A1* | 11/2018 | Ding | G06F 16/2237 |
| 2018/0373925 A1* | 12/2018 | Wang | G16H 50/70 |
| 2019/0042867 A1* | 2/2019 | Chen | G06K 9/00979 |
| 2019/0043201 A1* | 2/2019 | Strong | G06K 9/00624 |
| 2019/0080207 A1* | 3/2019 | Chang | G06K 9/723 |
| 2019/0108411 A1* | 4/2019 | Liu | G06K 9/6254 |
| 2019/0130278 A1* | 5/2019 | Karras | G06N 3/082 |
| 2019/0156193 A1* | 5/2019 | Jaroch | G06F 16/27 |
| 2019/0188524 A1* | 6/2019 | He | G06K 9/6256 |
| 2019/0266262 A1* | 8/2019 | He | G06F 16/3347 |
| 2019/0303754 A1* | 10/2019 | Ranjan | G06N 3/08 |
| 2019/0318003 A1* | 10/2019 | Kennedy | G06F 16/345 |
| 2019/0325616 A1* | 10/2019 | Chhaya | G06T 11/60 |
| 2019/0377979 A1* | 12/2019 | Jiang | G06T 9/002 |
| 2020/0026908 A1* | 1/2020 | Henderson | G06K 9/6248 |
| 2020/0097604 A1* | 3/2020 | Lee | G06K 9/4685 |
| 2020/0110930 A1* | 4/2020 | Simantov | G06N 20/00 |
| 2020/0175352 A1* | 6/2020 | Cha | G06N 3/0454 |
| 2020/0234468 A1* | 7/2020 | Lerchner | G06T 9/002 |
| 2020/0411167 A1* | 12/2020 | Kearney | G16H 30/40 |
| 2021/0089571 A1* | 3/2021 | Perone | G06F 40/30 |
| 2021/0117948 A1* | 4/2021 | Voss | G07G 1/0054 |

\* cited by examiner

ENTITY MATCHING USING VISUAL INFORMATION

The present invention generally relates to entity matching, and more particularly, to a method and system for matching entities using visual information.

BACKGROUND

Entity matching involves finding records (e.g., database records) corresponding to the same entity. Entity matching is important for data cleaning and data integration.

SUMMARY

One embodiment provides a method comprising receiving a first set of information corresponding to a first entity and receiving a second set of information corresponding to a second entity. Each set of information received corresponding to each entity comprises visual information relating to the entity. The method further comprises encoding each set of information, and classifying the first entity and the second entity as either matching entities or non-matching entities based on the encoding.

These and other aspects, features and advantages of the invention will be understood with reference to the drawing figures, and detailed description herein, and will be realized by means of the various elements and combinations particularly pointed out in the appended claims. It is to be understood that both the foregoing general description and the following brief description of the drawings and detailed description of the invention are exemplary and explanatory of preferred embodiments of the invention, and are not restrictive of the invention, as claimed.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

The detailed description explains the preferred embodiments of the invention, together with advantages and features, by way of example with reference to the drawings.

DETAILED DESCRIPTION

The present invention generally relates to entity matching, and more particularly, to a method and system for matching entities using visual information. One embodiment provides a method comprising receiving a first set of information corresponding to a first entity and receiving a second set of information corresponding to a second entity. Each set of information received corresponding to each entity comprises visual information relating to the entity. The method further comprises encoding each set of information, and classifying the first entity and the second entity as either matching entities or non-matching entities based on the encoding.

For expository purposes, the terms "visual information" as used herein refers to visual media such as, but not limited to, images, photos, videos, graphics, etc.

An entity may have structured records in multiple databases, wherein the multiple databases have different conventions. As such, there is a need to link structured records for the same entity (i.e., matching entities from the multiple databases). Conventional solutions for matching entities do not factor into account visual information.

One or more embodiments of the invention provide a method and system for matching entities based on visual information. Leveraging visual information to match entities may result in increased accuracy. One or more embodiments of the invention may be utilized by different types of application as the one or more embodiments address issues that arise when entities from multiple databases need to be linked. For example, one or more embodiments of the invention may be utilized for de-duplicating entities from different databases.

Figure 1:
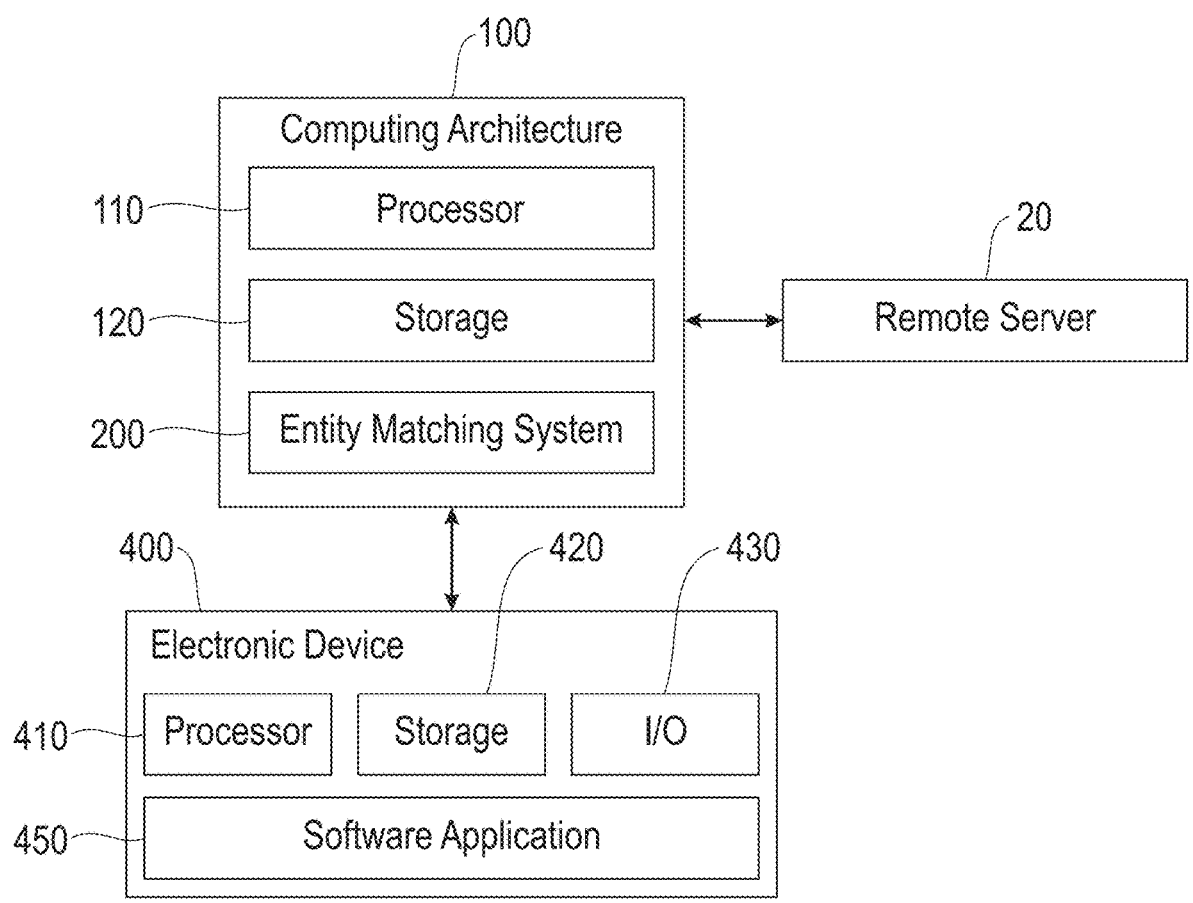
FIG. 1 illustrates an example computing architecture for matching entities using visual information, in accordance with an embodiment of the invention.

FIG. 1 illustrates an example computing architecture 100 for matching entities using visual information, in accordance with an embodiment of the invention. In one embodiment, the computing architecture 100 is a centralized computing architecture. In another embodiment, the computing architecture 100 is a distributed computing architecture.

In one embodiment, the computing architecture 100 includes computation resources such as, but not limited to, one or more processor units 110 and one or more storage units 120. One or more applications may execute/operate on the computing architecture 100 utilizing the computation resources of the computing architecture 100.

In one embodiment, the applications on the computing architecture 100 include, but are not limited to, an entity matching system 200 configured to match a pair of entities based on data from different data sources, wherein the data comprises structured information relating to each entity and visual information relating to each entity. The entity matching system 200 factors into account visual information to improve integrity of decision making on entities.

In one embodiment, the entity matching system 200 is configured to exchange data with an electronic device 400 and/or a remote server 20 over a connection (e.g., a wireless connection such as a WiFi connection or a cellular data connection, a wired connection, or a combination of the two). In one embodiment, an electronic device 400 and/or a remote server 20 may be a data source. For example, a remote server 20 and/or an electronic device 400 may provide structured information relating to an entity and/or visual information relating to the entity.

In one embodiment, an electronic device 400 is equipped with one or more computation resources such as, but not limited to, one or more processor units 410 and one or more storage units 420. One or more applications may execute/operate on an electronic device 400 utilizing one or more computation resources of the electronic device 400 such as, but not limited to, one or more software applications 450 loaded onto or downloaded to the electronic device 400.

Examples of electronic devices 400 include, but are not limited to, a desktop computer, a mobile device (e.g., a smart phone or a tablet), etc.

In one embodiment, an electronic device 400 comprises one or more input/output (I/O) units 430 integrated in or coupled to the electronic device 400, such as a keyboard, a keypad, a touch interface, a display screen, etc. A user may utilize an I/O module 430 of an electronic device 400 to configure one or more user preferences, parameters (e.g., a pre-determined threshold), etc.

In one embodiment, the entity matching system 200 may be accessed or utilized by one or more online services (e.g., AI services) hosted on a remote server 20 and/or one or more software applications 450 operating on an electronic device 400. For example, a software application 450 on an electronic device 400 may utilize the entity matching system 200 to obtain information relating to an entity (e.g., a landmark, a building, etc.) captured in an image (e.g., an image downloaded to the electronic device 400 or captured by a camera of the electronic device 400).

Figure 2A:
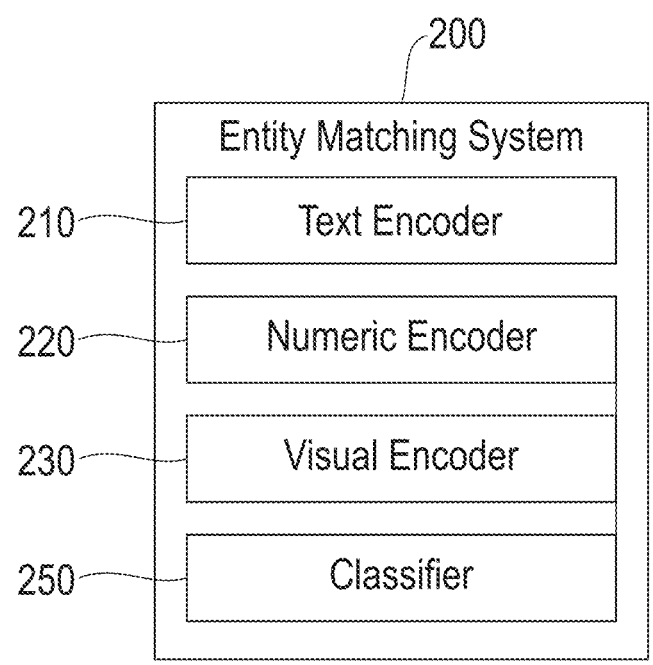
FIG. 2A illustrates an example entity matching system, in accordance with an embodiment of the invention.
Figure 2B:
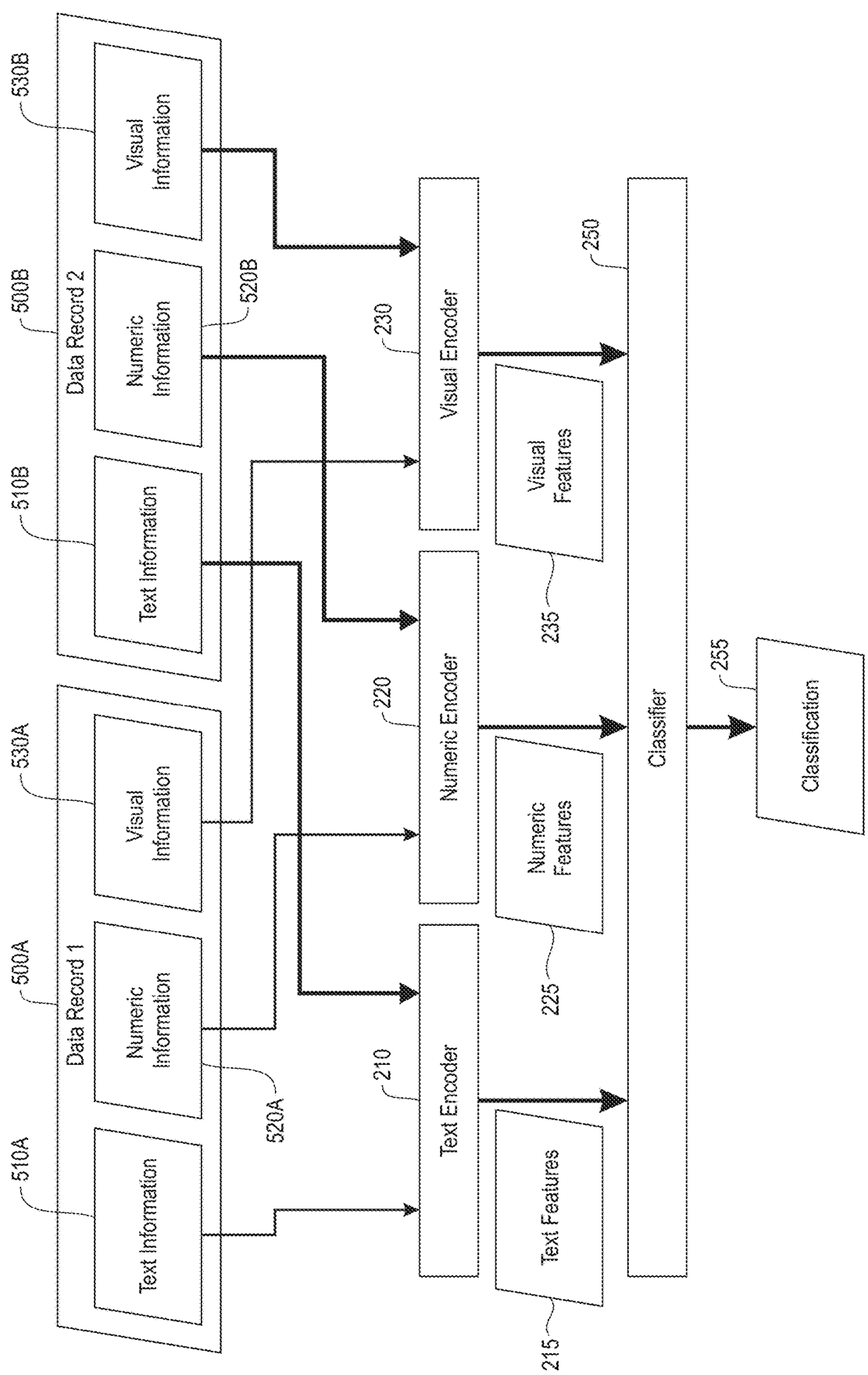
FIG. 2B illustrates an example workflow of the entity matching system in FIG. 2A, in one or more embodiments.

FIG. 2A illustrates an example entity matching system 200, in accordance with an embodiment of the invention. FIG. 2B illustrates an example workflow of the entity matching system 200 in FIG. 2A, in one or more embodiments. In one embodiment, the entity matching system 200 is configured to receive or obtain records from different data sources. For example, as shown in FIG. 2B, the entity matching system 200 is configured to receive or obtain a first record 500A corresponding to a first entity ("Entity 1") from a first data source, and a second record 500B corresponding to a second entity ("Entity 2") from a second data source. In one embodiment, a data source is a local database maintained on a storage unit 120 of the computing architecture 100. In another embodiment, a data source is a remote database maintained on an electronic device 400 or a remote server 20.

In one embodiment, a record corresponding to an entity comprises a structured record including one or more types of structured information such as, but not limited to, text information relating to the entity, and numeric information relating to the entity. In one embodiment, text information relating to an entity comprises one or more text descriptors of the entity (e.g., name, color, object type, etc.). In one embodiment, numeric information relating to an entity comprises one or more numeric descriptors of the entity (e.g., location coordinates, size, dimensions, etc.). In one embodiment, a record corresponding to an entity further comprises visual information relating to the entity. For example, visual information relating to an entity comprises a plurality of images of the entity. As another example, visual information relating to an entity comprises a single image of the entity.

For example, as shown in FIG. 2B, the first record 500A comprises a first set of text information 510A relating to Entity 1, a first set of numeric information 520A relating to Entity 1, and a first set of visual information 530A relating to Entity 1. The second record 500B comprises a second set of text information 510B relating to Entity 2, a second set of numeric information 520B relating to Entity 2, and a second set of visual information 530B relating to Entity 2.

In one embodiment, if a record corresponding to an entity does not include visual information relating to the entity, the entity matching system 200 may invoke/trigger an application (e.g., a software application 450) to obtain visual information relating to the entity using some structured information included in the record. In one embodiment, the entity matching system 200 invokes a search for visual information relating to a first entity and/or a second entity when a probability of classifying the first entity and the second entity as either matching entities or non-matching entities without visual information is less than a pre-determined threshold. For example, in one embodiment, the entity matching system 200 invokes a web browser to search for images relating to an entity using some structured information included in a record relating to the entity (e.g., text information relating to the entity), where images returned by the web browser are used as visual information relating to the entity.

In one embodiment, the entity matching system 200 comprises a text encoder 210 configured to encode text information relating to an entity to a vector space (i.e., text encoding). In one embodiment, for each entity of a pair of entities (e.g., Entity 1 and Entity 2), the text encoder 210 is configured to encode text information relating to the entity to a corresponding set of entity level features. In one embodiment, a set of entity level features resulting from encoding text information relating to an entity comprises, but is not limited to, one or more of the following statistics/models: term frequency-inverse document frequency (tf-idf), bag-of-words, paragraph2vec, etc. As shown in FIG. 2B, in one embodiment, the text encoder 210 is configured to encode the first set of text information 510A relating to Entity 1 to a first set of entity level features, and the second set of text information 510B relating to Entity 2 to a second set of entity level features.

In another embodiment, for a pair of entities (e.g., Entity 1 and Entity 2), the text encoder 210 is configured to apply a pairwise comparison algorithm to each set of text information relating to each entity to encode both sets of text information to a corresponding set of pairwise features. In one embodiment, a set of pairwise features resulting from encoding two sets of text information comprises, but is not limited to, one or more of the following statistics indicative of a difference or a cosine similarity between the two sets of text information: a Jaccard distance, a cosine similarity, etc. As shown in FIG. 2B, in another embodiment, the text encoder 210 is configured to encode both the first set of text information 510A relating to Entity 1 and the second set of text information 510B relating to Entity 2 to a corresponding set of pairwise features.

In one embodiment, the entity matching system 200 comprises a numeric encoder 220 configured to encode numeric information relating to an entity to a vector space (i.e., numeric encoding). In one embodiment, for a pair of entities (e.g., Entity 1 and Entity 2), the numeric encoder 220 is configured to apply a pairwise comparison algorithm to each set of numeric information relating to each entity to encode both sets of numeric information to a corresponding set of pairwise features. In one embodiment, a set of pairwise features resulting from encoding two sets of numeric information comprises, but is not limited to, one or more statistics indicative of a difference or a cosine similarity between the two sets of numeric information. As shown in FIG. 2B, in one embodiment, the numeric encoder 220 is configured to encode both the first set of numeric information 520A relating to Entity 1 and the second set of numeric information 520B relating to Entity 2 to a corresponding set of pairwise features.

In one embodiment, the entity matching system 200 comprises a visual encoder 230 configured to encode visual information relating to an entity to a vector space (i.e., visual encoding). In one embodiment, for a pair of entities (e.g., Entity 1 and Entity 2), the visual encoder 230 performs visual encoding in the following manner: first, the visual encoder 230 performs visual embedding on each set of visual information relating to each entity utilizing a convolutional neural network (CNN) to generate a corresponding set of visual embeddings for the entity. For example, for each set of visual information relating to each entity, the visual encoder 230 embeds each image included in the set of visual information to generate a corresponding set of embedded images for the entity. Next, the visual encoder 230 is configured to apply a pairwise comparison algorithm to each set of visual embeddings generated for each entity to encode both sets of visual embeddings to a corresponding set of pairwise features. For example, the visual encoder 230 is configured to apply a pairwise comparison algorithm to each set of embedded images generated for each entity to encode both sets of embedded images to a corresponding set of pairwise features. In one embodiment, a set of pairwise features resulting from encoding two sets of visual embeddings comprises, but is not limited to, one or more of the following statistics indicative of a difference or a cosine similarity between the two sets of visual embeddings: a maximum cosine similarity, a top n cosine similarity (wherein n is a pre-determined threshold), a top n similar visual embeddings, etc.

As shown in FIG. 2B, in one embodiment, the visual encoder 230 is configured to perform visual embedding on the first set of visual information 530A relating to Entity 1 to generate a first set of visual embeddings for Entity 1, perform visual embedding on the second set of visual information 530B relating to Entity 2 to generate a second set of visual embeddings for Entity 2, and encode both the first set of visual embeddings for Entity 1 and the second set of visual embeddings for Entity 2 to a corresponding set of pairwise features.

In one embodiment, the entity matching system 200 comprises a classifier 250 configured to: (1) receive feature information relating to records corresponding to a pair of entities (e.g., Entity 1 and Entity 2), wherein the feature information received comprises a concatenation of entity level features and/or pairwise features resulting from different types of encoding (i.e., text encoding, numeric encoding, and visual encoding) performed on the records, (2) based on the feature information, classify the pair of entities with a classification label 255 indicative of whether the pair of entities are matching entities or non-matching entities, and (3) generate an output comprising the classification label 255.

As shown in FIG. 2B, in one embodiment, the classifier 250 is configured to receive feature information comprising text features 215 from the text encoder 210, numeric features 225 from the numeric encoder 220, and visual features 235 from the visual encoder 230. In one embodiment, the text features 215 comprise a first set of entity level features resulting from encoding of a first set of text information 510A relating to Entity 1 and a second set of entity level features resulting from encoding of a second set of text information 510B relating to Entity 2. In another embodiment, the text features 215 comprise a set of pairwise features resulting from encoding of both the first set of text information 510A relating to Entity 1 and the second set of text information 510B relating to Entity 2. In one embodiment, the numeric features 225 comprise a set of pairwise features resulting from encoding of both a first set of numeric information 520A relating to Entity 1 and a second set of numeric information 520B relating to Entity 2. In one embodiment, the visual features 235 comprise a set of pairwise features resulting from encoding of both a first set of visual information 530A relating to Entity 1 and a second set of visual information 530B relating to Entity 2

In one embodiment, the classifier 250 is a machine learning model trained using a supervised learning algorithm. Examples of different machine learning models include, but are not limited to, neural networks, support vector machines, decision trees, etc.

Figure 3:
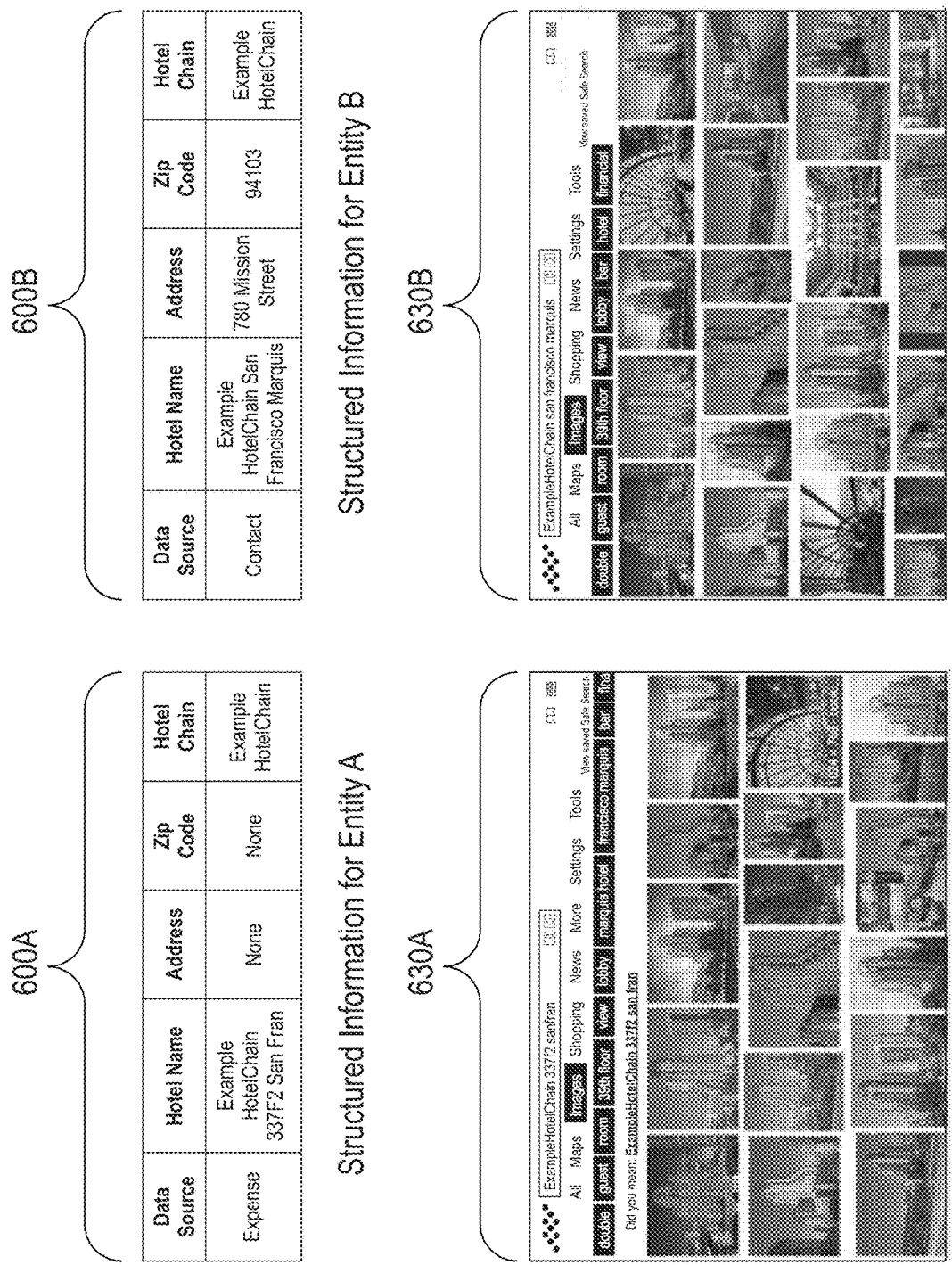
FIG. 3 illustrates examples of different records from different data sources, in accordance with one embodiment of the invention.

FIG. 3 illustrates examples of different records from different data sources, in accordance with one embodiment of the invention. Specifically, FIG. 3 shows a first record 600A corresponding to a first entity ("Entity A"). The entity matching system 200 receives or obtains the first record 600A from a first data source, wherein the first data source is a first database ("Expense") maintaining expense information for different hotels. The first record 600A comprises structured information relating to Entity A, wherein the structured information comprises text information and numeric information relating to Entity A such as a hotel name of Entity A ("ExampleHotelChain 337F2 San Fran") and a hotel chain that Entity A belongs to ("ExampleHotelChain").

Also shown in FIG. 3 is a second record 600B corresponding to a second entity ("Entity B"). The entity matching system 200 receives or obtains the second record 600B from a second data source, wherein the second data source is a second database ("Contract") maintaining contract information for different hotels. The second record 600B comprises structured information relating to Entity B, wherein the structured information comprises text information and numeric information relating to Entity B such as a hotel name of Entity B ("ExampleHotelChain San Francisco Marquis"), an address of Entity B ("780 Mission Street"), a zip code of Entity B ("94103"), and a hotel chain that Entity B belongs to ("ExampleHotelChain").

In one embodiment, visual information relating to an entity is included in a corresponding record. In another embodiment, the entity matching system 200 may invoke/trigger an application to obtain visual information relating to an entity using some structured information included in a corresponding record. For example, as shown in FIG. 3, in another embodiment, the entity matching system 200 invokes a web browser to search for images relating to Entity A using the hotel name of Entity A. The entity matching system 200 uses a first collection of images 630A returned by the web browser as visual information relating to Entity A. The entity matching system 200 also invokes the web browser to search for images relating to Entity B using the hotel name of Entity B. The entity matching system 200 uses a second collection of images 630B returned by the web browser as visual information relating to Entity B. Based on the records 600A, 600B and the collection of images 630A, 630B, the entity matching system 200 classifies Entity A and Entity B as either matching entities (i.e., the same hotel) or non-matching entities (i.e., different hotels).

Figure 4:
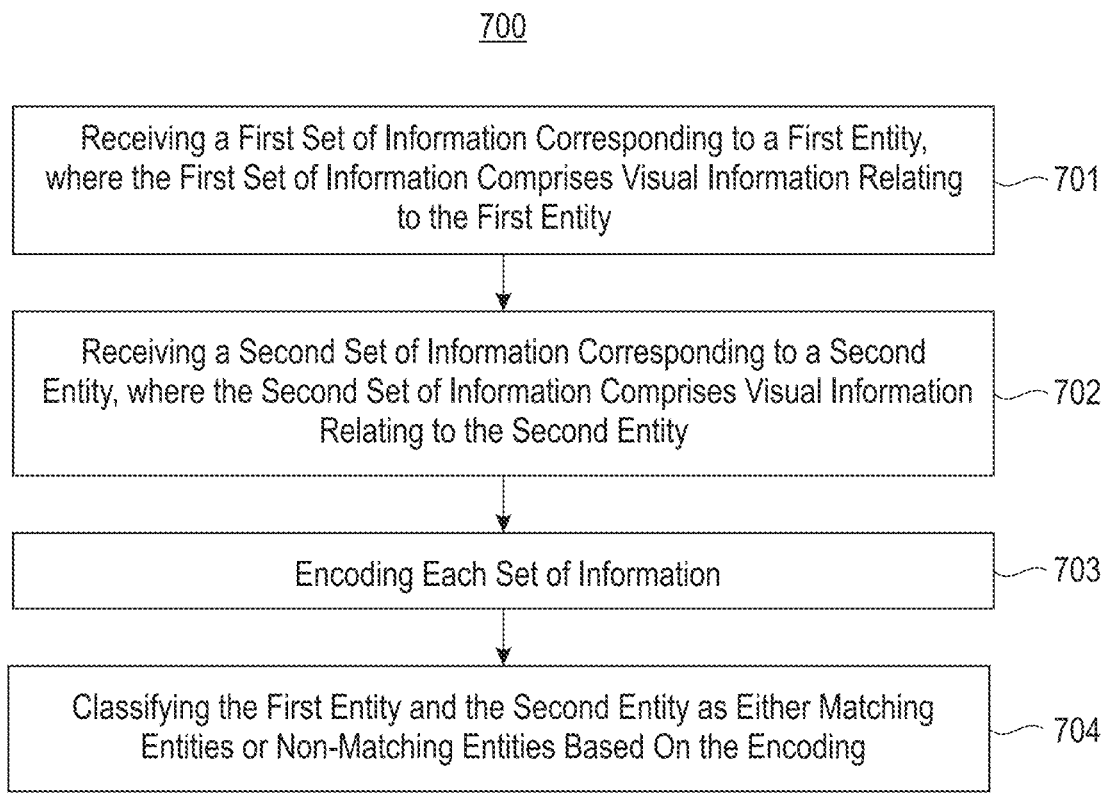
FIG. 4 is a flowchart for an example process for matching entities using visual information, in accordance with an embodiment of the invention.

FIG. 4 is a flowchart for an example process 700 for matching entities using visual information, in accordance with an embodiment of the invention. Process block 701 includes receiving a first set of information corresponding to a first entity, wherein the first set of information comprises visual information relating to the first entity. Process block 702 includes receiving a second set of information corresponding to a second entity, wherein the second set of information comprises visual information relating to the second entity. Process block 703 includes encoding each set of information. Process block 704 includes classifying the first entity and the second entity as either matching entities or non-matching entities based on the encoding.

In one embodiment, process blocks 701-704 are performed by one or more components of the entity matching system 200, such as the text encoder 210, the numeric encoder 220, the visual encoder 230, and the classifier 250.

Figure 5:
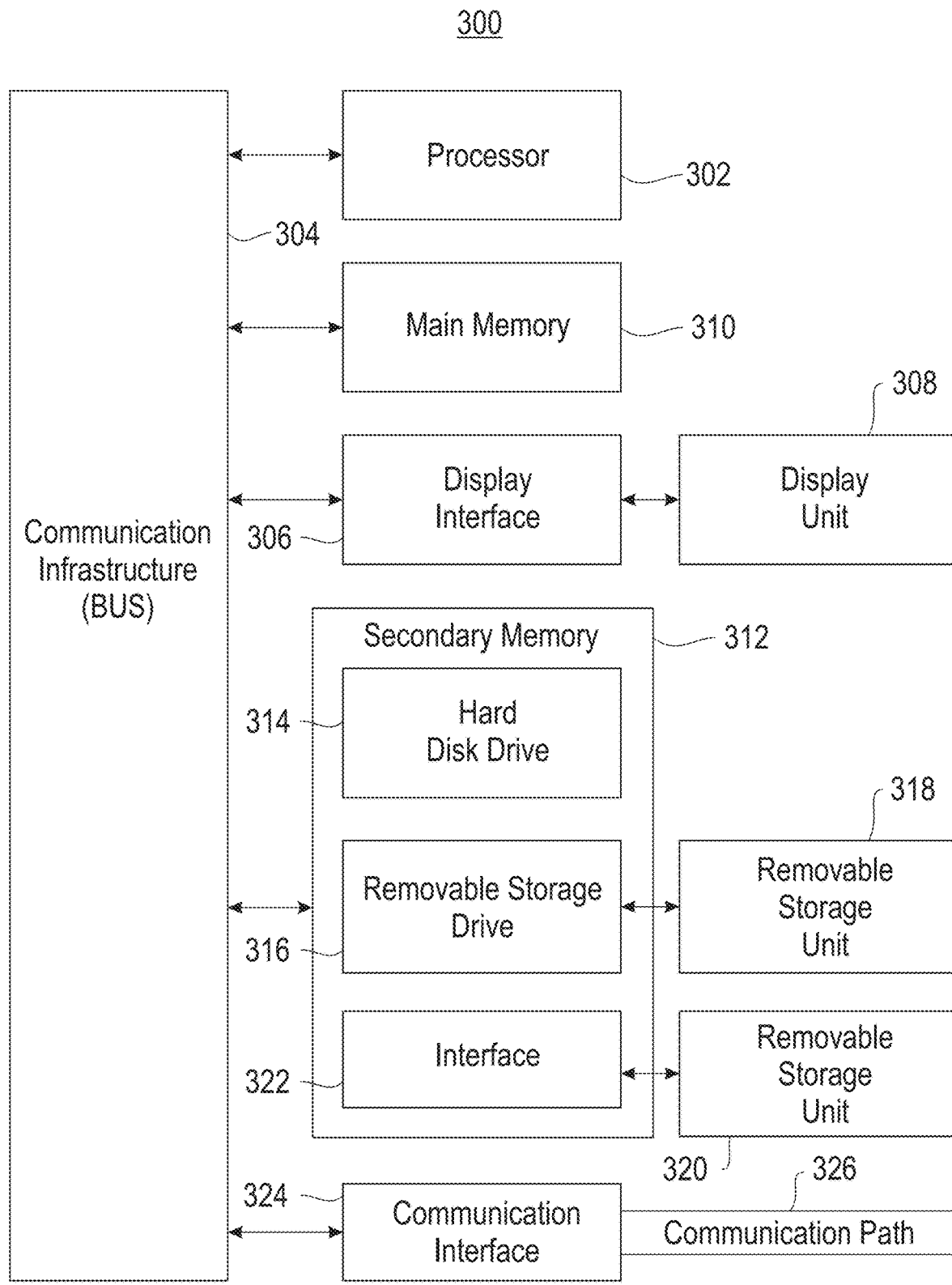
FIG. 5 is a high level block diagram showing an information processing system useful for implementing an embodiment of the present invention.

FIG. 5 is a high level block diagram showing an information processing system 300 useful for implementing one embodiment of the invention. The computer system includes one or more processors, such as processor 302. The processor 302 is connected to a communication infrastructure 304 (e.g., a communications bus, cross-over bar, or network).

The computer system can include a display interface 306 that forwards graphics, text, and other data from the voice communication infrastructure 304 (or from a frame buffer not shown) for display on a display unit 308. In one embodiment, the computer system also includes a main memory 310, preferably random access memory (RAM), and also includes a secondary memory 312. In one embodiment, the secondary memory 312 includes, for example, a hard disk drive 314 and/or a removable storage drive 316, representing, for example, a floppy disk drive, a magnetic tape drive, or an optical disk drive. The removable storage drive 316 reads from and/or writes to a removable storage unit 318 in a manner well known to those having ordinary skill in the art. Removable storage unit 318 represents, for example, a floppy disk, a compact disc, a magnetic tape, or an optical disk, etc. which is read by and written to by removable storage drive 316. As will be appreciated, the removable storage unit 318 includes a computer readable medium having stored therein computer software and/or data.

In alternative embodiments, the secondary memory 312 includes other similar means for allowing computer programs or other instructions to be loaded into the computer system. Such means include, for example, a removable storage unit 320 and an interface 322. Examples of such means include a program package and package interface (such as that found in video game devices), a removable memory chip (such as an EPROM, or PROM) and associated socket, and other removable storage units 320 and interfaces 322, which allows software and data to be transferred from the removable storage unit 320 to the computer system.

In one embodiment, the computer system also includes a communication interface 324. Communication interface 324 allows software and data to be transferred between the computer system and external devices. In one embodiment, examples of communication interface 324 include a modem, a network interface (such as an Ethernet card), a communication port, or a PCMCIA slot and card, etc. In one embodiment, software and data transferred via communication interface 324 are in the form of signals which are, for example, electronic, electromagnetic, optical, or other signals capable of being received by communication interface 324. These signals are provided to communication interface 324 via a communication path (i.e., channel) 326. In one embodiment, this communication path 326 carries signals and is implemented using wire or cable, fiber optics, a phone line, a cellular phone link, an RF link, and/or other communication channels.

Embodiments of the present invention provide a system, a method, and/or a computer program product. In one embodiment, the computer program product includes a computer readable storage medium (or media) having computer readable program instructions thereon for causing a processor to carry out aspects of the present invention. The computer readable storage medium can be a tangible device that can retain and store instructions for use by an instruction execution device. In one embodiment, the computer readable storage medium is, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. In one embodiment, the network comprises copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

In one embodiment, computer readable program instructions for carrying out operations of embodiments of the present invention are assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. In one embodiment, the computer readable program instructions execute entirely on the user's computer, partly on the user's computer, as a stand-alone software package, partly on the user's computer and partly on a remote computer or entirely on the remote computer or server. In the latter scenario, in one embodiment, the remote computer is connected to the user's computer through any type of network, including a local area network (LAN) or a wide area network (WAN), or the connection is made to an external computer (for example, through the Internet using an Internet Service Provider). In some embodiments, electronic circuitry including, for example, programmable logic circuitry, field-programmable gate arrays (FPGA), or programmable logic arrays (PLA) execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

In one embodiment, these computer readable program instructions are provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. In one embodiment, these computer readable program instructions are also stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

In one embodiment, the computer readable program instructions are also loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, in one embodiment, each block in the flowchart or block diagrams represents a module, segment, or portion of instructions, which comprises one or more executable instructions for implementing the specified logical function(s). In some alternative implementations, the functions noted in the block occur out of the order noted in the figures. For example, in one embodiment, two blocks shown in succession are, in fact, executed substantially concurrently, or the blocks are sometimes executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

From the above description, it can be seen that embodiments of the present invention provide a system, computer program product, and method for implementing the embodiments of the invention. Embodiments of the present invention further provide a non-transitory computer-useable storage medium for implementing the embodiments of the invention. The non-transitory computer-useable storage medium has a computer-readable program, wherein the program upon being processed on a computer causes the computer to implement the steps of embodiments of the present invention described herein. References in the claims to an element in the singular is not intended to mean "one and only" unless explicitly so stated, but rather "one or more." All structural and functional equivalents to the elements of the above-described exemplary embodiment that are currently known or later come to be known to those of ordinary skill in the art are intended to be encompassed by the present claims. No claim element herein is to be construed under the provisions of 35 U.S.C. section 112, sixth paragraph, unless the element is expressly recited using the phrase "means for" or "step for."

The terminology used herein is for the purpose of describing particular embodiments of the invention only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of embodiments of the present invention has been presented for purposes of illustration and description, but is not intended to be exhaustive or limited to embodiments of the invention in the form disclosed. Many modifications and variations will be apparent to those of ordinary skill in the art without departing from the scope and spirit of embodiments of the invention. Various embodiments of the invention were chosen and described in order to best explain the principles of the embodiments of the invention and the practical application, and to enable others of ordinary skill in the art to understand the embodiments of the invention with various modifications as are suited to the particular use contemplated.

The invention claimed is:

1. A method comprising:
receiving a first set of information corresponding to a first entity, wherein the first set of information comprises first text information relating to the first entity and further comprises one or more first images of the first entity;
receiving a second set of information corresponding to a second entity, wherein the second set of information comprises second text information relating to the second entity and further comprises one or more second images of the second entity;
performing visual encoding by:
generating a first set of visual embeddings by embedding the first images of the first entity using a convolutional neural network (CNN);
generating a second set of visual embeddings by embedding the second images of the second entity using the CNN; and
encoding the first set of visual embeddings and the second set of visual embeddings to a first set of statistics indicative of a similarity between the first images of the first entity and the second images of the second entity by applying a pairwise comparison algorithm to the first set of visual embeddings and the second set of visual embeddings;
performing text encoding by:
encoding the first text information relating to the first entity to a first set of features indicative of occurrence of terms within the first text information; and encoding the second text information relating to the second entity to a second set of features indicative of occurrence of terms within the second text information; and classifying the first entity and the second entity as either matching entities or non-matching entities based on a concatenation of the first set of statistics, the first set of features, and the second set of features.

2. The method of claim 1, wherein each set of information corresponding to each entity includes one of a plurality of images of the entity or a single image of the entity, and each set of visual embeddings comprises a set of embedded images.

3. The method of claim 1, wherein the first set of statistics comprise one of the following: a maximum cosine similarity between the first set of visual embeddings and the second set of visual embeddings, a top n cosine similarity between the first set of visual embeddings and the second set of visual embeddings, or a top n similar visual embeddings between the first set of visual embeddings and the second set of visual embeddings.

4. The method of claim 1, wherein classifying the first entity and the second entity as either matching entities or non-matching entities based on a concatenation of the first set of statistics, the first set of features, and the second set of features comprises:

utilizing a classifier trained using a supervised learning algorithm, wherein the classifier is configured to classify the first entity and the second entity as either matching entities or non-matching entities based in part on the first set of statistics.

5. The method of claim 4, wherein the first set of information further comprises first numeric information relating to the first entity, and the second set of information further comprises second numeric information relating to the second entity.

6. The method of claim 4, wherein the classifier is configured to classify the first entity and the second entity as either matching entities or non-matching entities further based in part on the first set of features and the second set of features.

7. The method of claim 6, wherein each set of features comprises one of the following statistics or models: term frequency-inverse document frequency (tf-idf), bag-of-words, or paragraph2vec.

8. The method of claim 4, wherein the classifier is further configured to classify the first entity and the second entity as either matching entities or non-matching entities further based in part on a second set of statistics.

9. The method of claim 8, wherein the second set of statistics comprise one of the following: a Jaccard distance between the first text information relating to the first entity and the second text information relating to the second entity, or a cosine similarity between the first text information relating to the first entity and the second text information relating to the second entity.

10. The method of claim 5, further comprising:

performing numeric encoding by encoding the first numeric information relating to the first entity and the second numeric information relating to the second entity to a second set of statistics indicative of a similarity between the first numeric information relating to the first entity and the second numeric information relating to the second entity, wherein the classifier is further configured to classify the first entity and the second entity as either matching entities or non-matching entities further based in part on the second set of statistics.

11. The method of claim 10, wherein the second set of statistics comprise one of the following: a difference between the first numeric information relating to the first entity and the second numeric information relating to the second entity, or a cosine similarity between the first numeric information relating to the first entity and the second numeric information relating to the second entity.

12. The method of claim 4, wherein the classifier is one of a neural network, a support vector machine, or a decision tree.

13. A system comprising:

at least one processor; and a non-transitory processor-readable memory device storing instructions that when executed by the at least one processor causes the at least one processor to perform operations including:

receiving a first set of information corresponding to a first entity, wherein the first set of information comprises first text information relating to the first entity and further comprises one or more first images of the first entity;

receiving a second set of information corresponding to a second entity, wherein the second set of information comprises second text information relating to the second entity and further comprises one or more second images of the second entity;

performing visual encoding by:

generating a first set of visual embeddings by embedding the first images of the first entity using a convolutional neural network (CNN);

generating a second set of visual embeddings by embedding the second images of the second entity using the CNN; and encoding the first set of visual embeddings and the second set of visual embeddings to a first set of statistics indicative of a similarity between the first images of the first entity and the second images of the second entity by applying a pairwise comparison algorithm to the first set of visual embeddings and the second set of visual embeddings;

performing text encoding by:

encoding the first text information relating to the first entity to a first set of features indicative of occurrence of terms within the first text information; and encoding the second text information relating to the second entity to a second set of features indicative of occurrence of terms within the second text information; and classifying the first entity and the second entity as either matching entities or non-matching entities based on a concatenation of the first set of statistics, the first set of features, and the second set of features.

14. The system of claim 13, wherein classifying the first entity and the second entity as either matching entities or non-matching entities based on a concatenation of the first set of statistics, the first set of features, and the second set of features comprises:

utilizing a classifier trained using a supervised learning algorithm, wherein the classifier is configured to classify the first entity and the second entity as either matching entities or non-matching entities based in part on the first set of statistics.

15. The system of claim 14, wherein the classifier is configured to classify the first entity and the second entity as either matching entities or non-matching entities further based in part on the first set of features and the second set of features.

16. The system of claim 14, wherein the classifier is further configured to classify the first entity and the second entity as either matching entities or non-matching entities further based in part on a second set of statistics.

17. The system of claim 14, wherein the operations further comprise:
performing numeric encoding by encoding the first numeric information relating to the first entity and the second numeric information relating to the second entity to a second set of statistics indicative of a similarity between the first numeric information relating to the first entity and the second numeric information relating to the second entity, wherein the classifier is further configured to classify the first entity and the second entity as either matching entities or non-matching entities further based in part on the second set of statistics.

18. A computer program product comprising a computer-readable hardware storage medium having program code embodied therewith, the program code being executable by a computer to implement a method comprising:
receiving a first set of information corresponding to a first entity, wherein the first set of information comprises first text information relating to the first entity and further comprises one or more first images of the first entity;
receiving a second set of information corresponding to a second entity, wherein the second set of information comprises second text information relating to the second entity and further comprises one or more second images of the second entity;
performing visual encoding by:
generating a first set of visual embeddings by embedding the first images of the first entity using a convolutional neural network (CNN);
generating a second set of visual embeddings by embedding the second images of the second entity using the CNN; and
encoding the first set of visual embeddings and the second set of visual embeddings to a first set of statistics indicative of a similarity between the first images of the first entity and the second images of the second entity by applying a pairwise comparison algorithm to the first set of visual embeddings and the second set of visual embeddings;
performing text encoding by:
encoding the first text information relating to the first entity to a first set of features indicative of occurrence of terms within the first text information; and
encoding the second text information relating to the second entity to a second set of features indicative of occurrence of terms within the second text information; and
classifying the first entity and the second entity as either matching entities or non-matching entities based on a concatenation of the first set of statistics, the first set of features, and the second set of features.

\* \* \* \* \*